(12) United States Patent
Fulop

(10) Patent No.: US 7,350,330 B2
(45) Date of Patent: Apr. 1, 2008

(54) FISHING ROD HOLDER

(76) Inventor: Frank Fulop, RR #1, Box 4, Eden Ontario (CA) N0J 1H0

( * ) Notice: Subject to any disclaimer, the term of this patent is extended or adjusted under 35 U.S.C. 154(b) by 333 days.

(21) Appl. No.: 10/951,662

(22) Filed: Sep. 29, 2004

(65) Prior Publication Data

US 2006/0064919 A1    Mar. 30, 2006

(51) Int. Cl.
*A01K 97/10*    (2006.01)
(52) U.S. Cl. .................. 43/21.2; 248/520; 248/523
(58) Field of Classification Search ............... 43/21.2; 248/520, 523, 530, 538; D22/147, 148
See application file for complete search history.

(56) References Cited

U.S. PATENT DOCUMENTS

| | | | |
|---|---|---|---|
| 879,052 A * | 2/1908 | Jeranek ................. 89/40.06 |
| 1,089,307 A | 3/1914 | Benet et al. |
| 1,520,543 A * | 12/1924 | Meachen ................ 248/534 |
| 2,438,388 A | 3/1948 | Dolk |
| 2,543,569 A * | 2/1951 | Dusatko ................ 248/517 |
| 2,592,306 A * | 4/1952 | Maze ................... 248/514 |
| 2,869,814 A * | 1/1959 | Hurlimann .............. 248/538 |
| 2,934,298 A * | 4/1960 | Aleskin ................ 248/512 |
| 3,033,503 A * | 5/1962 | Wenderski .............. 43/21.2 |
| 3,341,157 A | 9/1967 | Duncan |
| 3,431,670 A | 3/1969 | Harpham |
| 3,636,649 A | 1/1972 | Paiva |
| 3,956,846 A | 5/1976 | Kent |
| 4,086,716 A | 5/1978 | Donahue |
| 4,696,122 A * | 9/1987 | Van Der Zyl ............ 43/21.2 |
| 4,730,408 A * | 3/1988 | Miller .................. 43/15 |
| 4,938,446 A * | 7/1990 | Williams ............... 248/530 |
| D315,012 S | 2/1991 | Koga |
| 5,009,027 A * | 4/1991 | Lee .................... 43/21.2 |
| 5,016,384 A * | 5/1991 | Johnson ................ 43/21.2 |
| 5,855,087 A | 1/1999 | Risinger |
| 5,975,479 A * | 11/1999 | Suter ................... 248/534 |
| 6,128,848 A | 10/2000 | Wong |
| D448,446 S | 9/2001 | Walls et al. |
| D448,447 S | 9/2001 | Sheppard |
| D471,952 S | 3/2003 | Cardenas |
| 6,568,122 B1 | 5/2003 | Smith |
| 6,646,557 B2 * | 11/2003 | Brake .................. 340/573.2 |
| 6,681,517 B1 * | 1/2004 | Solomon ................ 43/21.2 |
| 6,718,682 B1 * | 4/2004 | Seitsinger et al. ......... 43/21.2 |

FOREIGN PATENT DOCUMENTS

| CA | 2014596 | 10/1991 |
|---|---|---|
| CA | 2118888 | 9/1994 |

(Continued)

*Primary Examiner*—David Parsley
(74) *Attorney, Agent, or Firm*—Rolf Fasth; Fasth Law Offices

(57) ABSTRACT

The fishing rod holder has a first rod support portion to support a bottom surface of an upper section of a fishing rod handle. The fishing rod holder has a second rod support portion to support a lower section of the fishing rod handle. The first rod support section has an upwardly facing base plate. The second rod support portion has a downwardly facing top plate. The rod holder has an opening defined therein to permit a handle of a fishing rod to pass through. The second rod support portion has a base wall against which an end of the fishing rod handle may rest.

11 Claims, 6 Drawing Sheets

FOREIGN PATENT DOCUMENTS

| | | |
|---|---|---|
| CA | 2187632 | 10/1995 |
| CA | 2176262 | 11/1997 |
| CA | 2227702 | 7/1999 |
| CA | 2317937 | 2/2002 |
| FR | 2557423 * | 7/1985 |
| FR | 2590962 * | 6/1987 |
| GB | 2097231 * | 11/1982 |

* cited by examiner

FISHING ROD HOLDER

BACKGROUND OF THE INVENTION

1. Field of the Invention

This invention relates to a fishing rod holder. In particular the present invention provides apparatus to hold a fishing rod where the fishing rod can be quickly and easily removed from the rod holder in the event of a fish taking the bait.

2. Description of the Prior Art

While fishing is a popular pastime a substantial amount of time is spent by the fisherman holding the fishing rod in a motionless upright position, watching the end of the fishing rod and line for a telltale sign of a fish taking the bait. Holding a fishing rod in this manor for long periods of time can be tiresome. To ease the fatigue, fishermen fishing from a riverbank or a shoreline have used various methods of supporting a fishing rod. These methods include a twig, with a top "V" branch, stuck in the bank over which the rod is inclined or even inclining the rod over a log, tackle box or rock.

Numerous attempts have been developed using tripods to replace the branch or stick such as U.S. Pat. Nos. 1,089,307; 2,438,388; 3,431,670; 3,636,649; 4,086,716 and 6,128,848.

Other efforts have been directed to fishing rod holders formed of bent rods. See for example U.S. Pat. Nos. 3,341,157; 3,956,846; D315,012; D448,446; D448,447; D471,952 and 6,568,122.

More complicated devices have also been proposed. Published Canadian Patent Application No. 2,118,888 is directed to a tube for holding a fishing rod. The tube pivots from an at rest position to an at ready position. Published Canadian Patent Application. No. 2,317,937 describes a fishing rod holder that allows for a gentle rod removal, so presentation of the bait allows the fish taking the bait not be disturbed. This rod holder works on a retention release mechanism, which uses springs while pivoting on a rod receptacle, which holds a rod retainer. Published Canadian Patent Application No. 2,227,702 describes a multipurpose fishing rod holder that can be used in ice fishing, from shore or a boat. The cylindrical body has a fastener to secure the rod at an angle. A protective cap is used to protect the cylindrical body, while the spike at the base of the cylinder is driven into the ice or ground. To secure this fishing rod holder to a boat a slider member is provided. Published Canadian Patent Application No. 2,187,632 describes a fishing rod holder that is worn on a belt on the hip or side of the user. A cylindrical tube opens at its top and bottom that slopes forwardly and outwardly from the hip plate supporting the fishing rod. This Hip Plate is made of thin flexible plastic. U.S. Pat. No. 5,855,087 describes a fishing rod holder pivotally mounted on a weighted container surface.

While these prior art fishing rod holders fulfill their respective objectives and requirements, most have moveable and adjustable parts, with screws, nuts and bolts, which can come loose and get lost at a great inconvenience to the fisherman. These devices also may or may not require assembly that further adds to the inconvenience to the fisherman, who just wants to fish.

SUMMARY OF THE INVENTION

It is an object of the invention to provide a fishing rod holder that is simple and easy and ready to use.

Thus in accordance with the present invention there is provided a fishing rod holder comprising a rod support section and a second section including means for attachment to the ground, dock, pier or seat of a boat wherein, said rod support section has a first support portion, a second support portion, means to connect said first and second support portions and a base portion. In a preferred embodiment the rod support section and second section of fishing rod holder are formed as one piece so that it is simple and easy and ready to use and said fishing rod holder has no adjustable parts and no screws, nuts or bolts, which can come loose and get lost.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
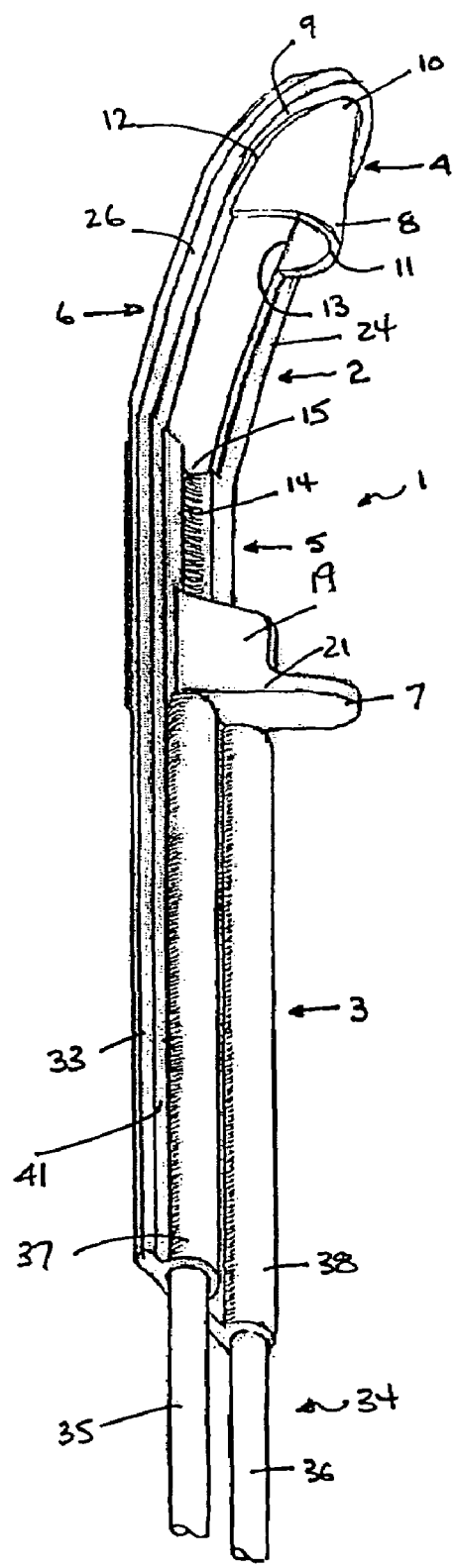
FIG. 1 is a perspective view of one embodiment of a fishing rod holder according to the present invention having a rod support section and a second section including means for attachment to the ground, dock, pier, seat etc.
Figure 2:
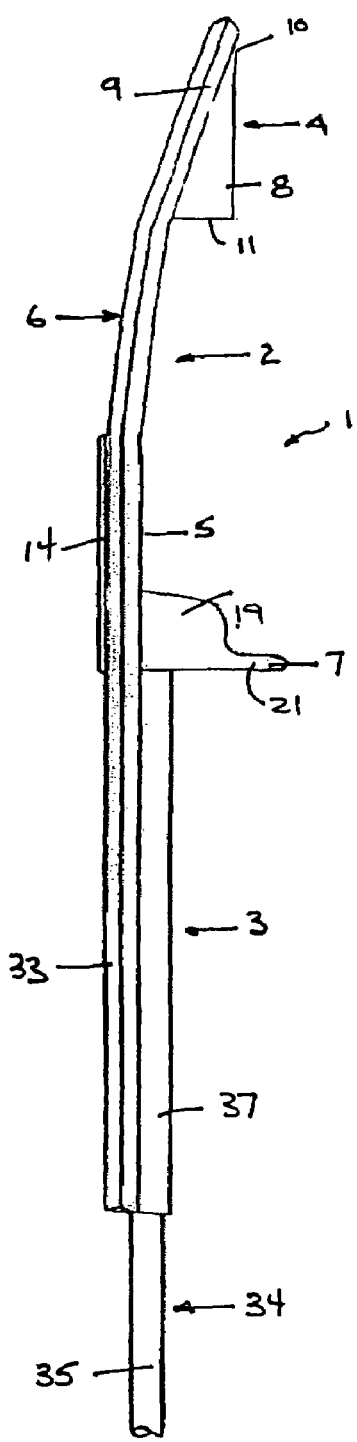
FIG. 2 is a side view of the fishing rod holder of FIG. 1.
Figure 3:
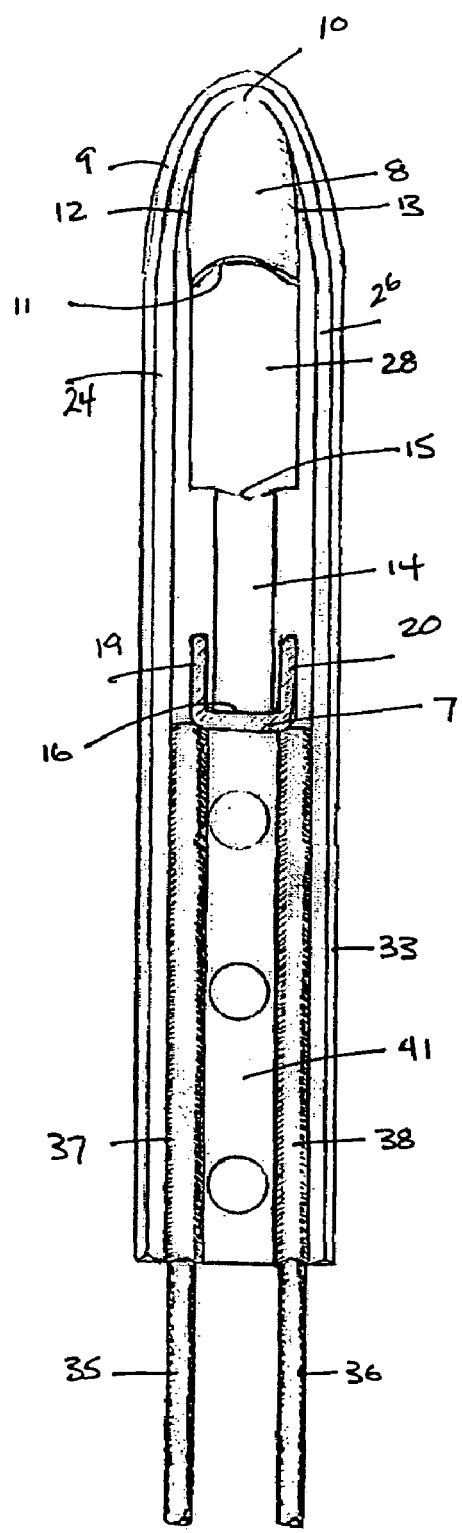
FIG. 3 is a top view of the fishing rod holder of FIGS. 1 and 2.
Figure 4:
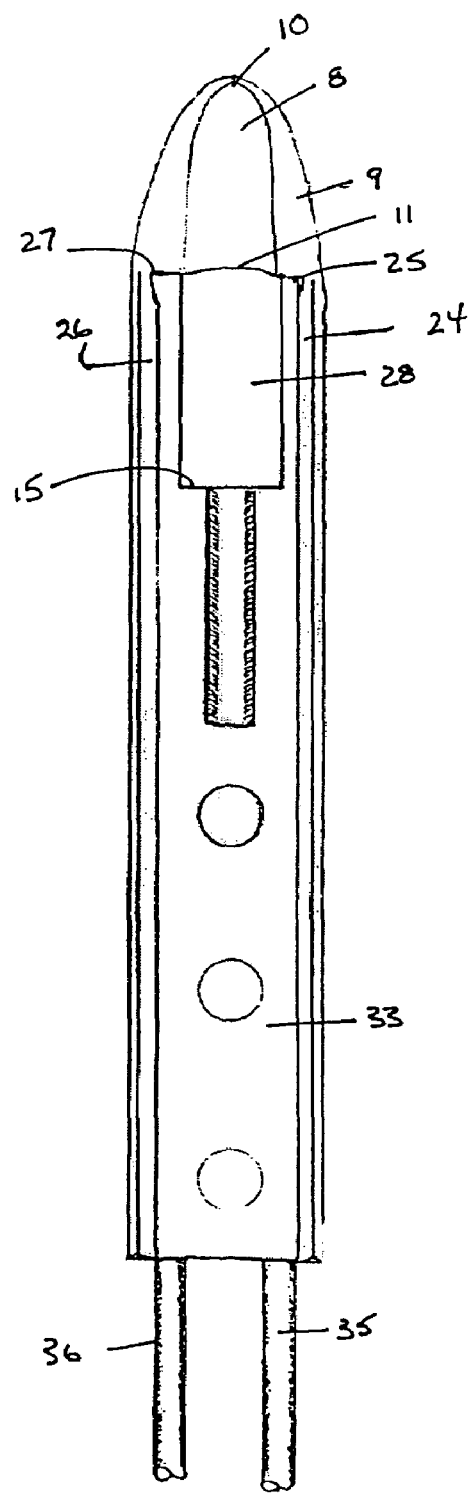
FIG. 4 is a bottom view of the fishing rod holder of FIG. 1-3.
Figure 5:
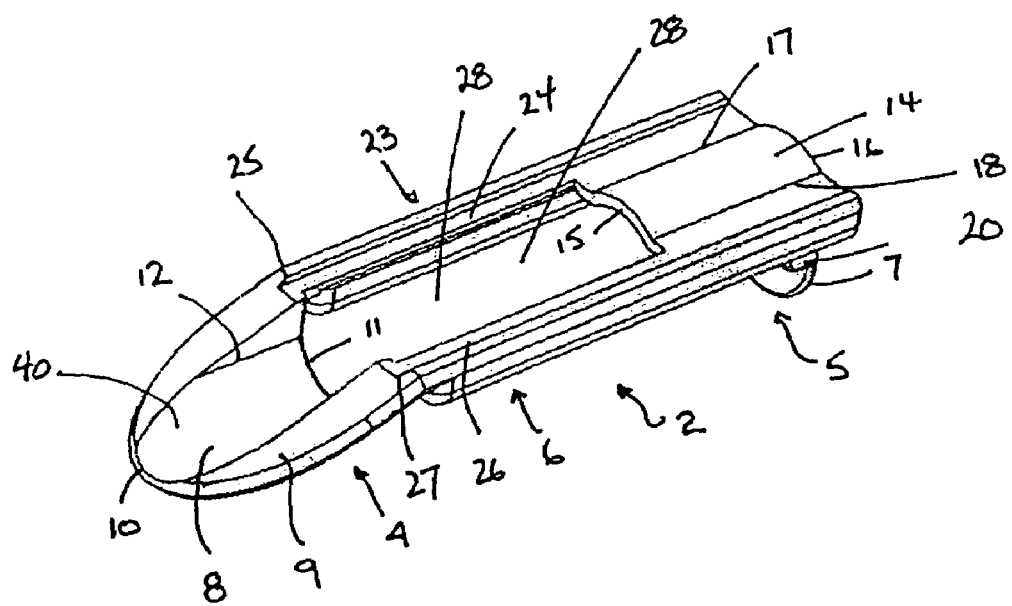
FIG. 5 is a top perspective view of the rod support section of the fishing rod holder of FIG. 1.
Figure 6:
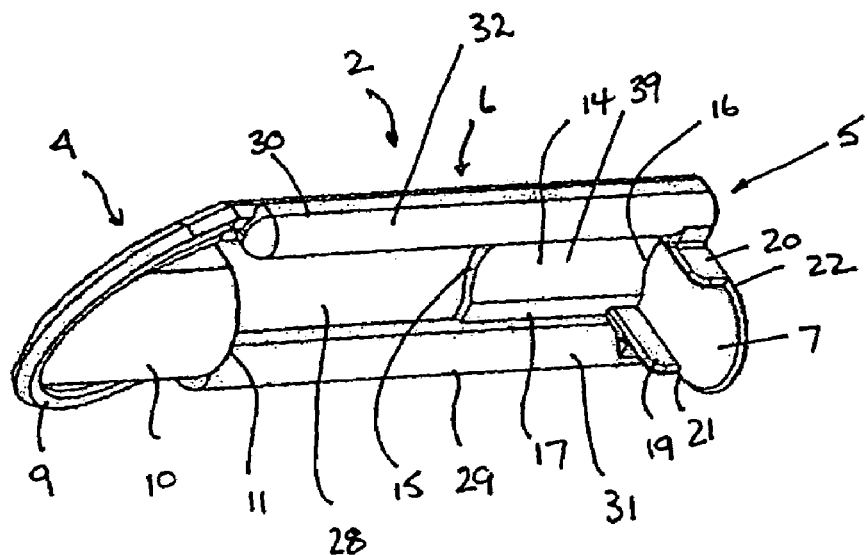
FIG. 6 is a bottom perspective view of the rod support section of the fishing rod holder of FIG. 5.
Figure 7:
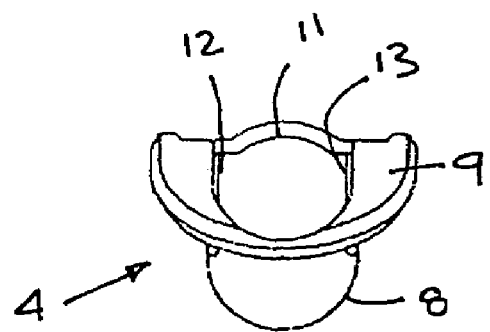
FIG. 7 is an end view of the rod support section of the fishing rod holder of FIGS. 5 and 6.
Figure 8:
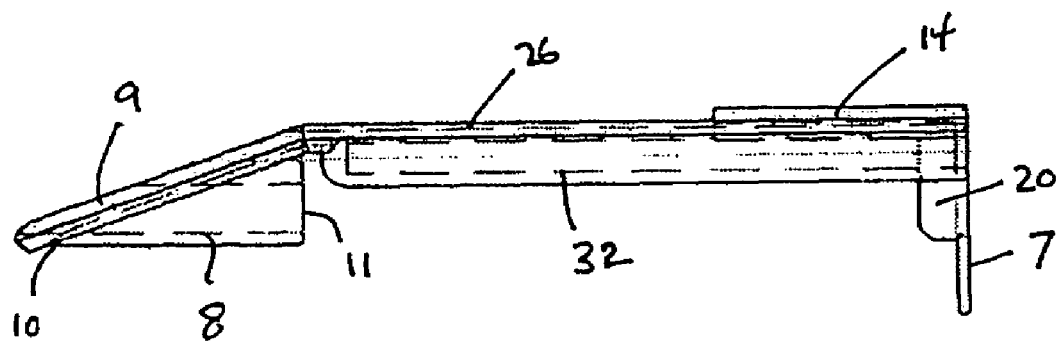
FIG. 8 is a side view of the rod support section of the fishing rod holder of FIG. 5-7.

Referring to FIGS. 1 to 8, one embodiment of a fishing rod holder according to the present invention is generally indicated at 1. The fishing rod holder 1 comprises a rod support section 2 and a second section 3 including means for attachment to the ground, dock, pier, seat etc.

As best seen in FIGS. 5-8, the rod support section 2 has a first support portion 4, a second support portion 5, means 6 to connect said first and second support portions 4,5 and a base portion 7. In the embodiment shown, the first support section 4 has a concave curved base plate 8 to support the bottom surface of an upper section of the fishing rod handle (not shown) and a lateral extending peripheral flange 9. The concave curved base plate 8 has a first end 10, second end 11 and opposing sides 12,13. The lateral extending peripheral flange 9 extends along the opposing sides 12,13, inclines downwardly and is tapered from the second end 11 to the first end 10 of concave curved base plate 8.

The second support portion 5 has a convex curved top plate 14 to support the top surface of a lower section of the fishing rod handle (not shown). The convex curved top plate 14 has a first end 15, second end 16 and opposing sides 17,18. Base portion 7 depends from the second end 16 of the convex curved top plate 14. The end of the fishing rod handle rests up against base portion 7 to position the handle within the rod support section. In the embodiment shown, base portion 7 has a pair of upstanding sidewalls 19,20 extending from the sides 21, 22 of base portion 7 along the opposing sides 17, 18 of the curved top plate 14 to keep the fishing rod handle from moving from side to side.

In the embodiment shown, the means 6 to connect said first and second support portions 4,5 comprise a pair of parallel connectors 23. One of said connectors 24 extends from one end 25 of the lateral extending peripheral flange 9 of the first support section 4 and along one side 17 of the convex curved top plate 14 of the second support portion 5. The other of said connectors 26 extends from another end 27 of the lateral extending peripheral flange 9 of the first support section 4 and along one side 18 of the convex curved top plate 14 of the second support portion 5. The connectors 24, 26, the second end 11 of the concave curved base plate 8 of the first support section 4 and the first end 15 of the convex top plate 14 of the second support section 5 define an opening 28.

In the embodiment illustrated (see FIG. 6 or 8), the bottom surface 29, 30 of connectors 24, 26 is reinforced with a longitudinal rib 31, 32.

The second section 3 of rod holder 1 is has a generally flat rectangular base 33 and means 34 for attachment to the ground, dock, pier, seat etc. In the embodiment illustrated (see FIGS. 1 to 4), the fishing rod holder 1 is intended to be attached to the ground such as a bank or beach. The means 34 for attachment to the ground comprises a pair of rods 35, 36 inserted into slots 37,38 formed on the bottom surface 41 of base 33. The rods 35, 36 can be molded into the slots 37, 38 on base 33 or detachable to facilitate transport. It is preferred that the rod support section 3 and second section 4 of fishing rod holder 1 be formed as one piece, from plastic or the like, so that it is simple and easy and ready to use by just sticking rods 35, 36 in the ground at the desired angle. By rods 35, 36 being molded into or otherwise fixed in slots 37, 38 the fishing rod holder of the present invention has no adjustable parts and no screws, nuts or bolts, which can come loose and get lost.

To use the fishing rod holder 1 of the embodiment illustrated, stick the rods 35, 36 in the ground at the desired angle. The handle of the fishing rod is inserted through the top of the opening 28 with the end of the fishing rod handle against base portion 7. A top surface of a lower section of the fishing rod handle (not shown) is rests against the bottom surface 39 of the convex curved top plate 14. A bottom surface of an upper section of the fishing rod handle (not shown) is supported by the top surface 40 of concave curved base plate 8. The "open-face" of fishing rod holder 1 permits the fishing rod to be quickly and easily removed from the rod holder in the event of a fish taking the bait.

Figure 9:
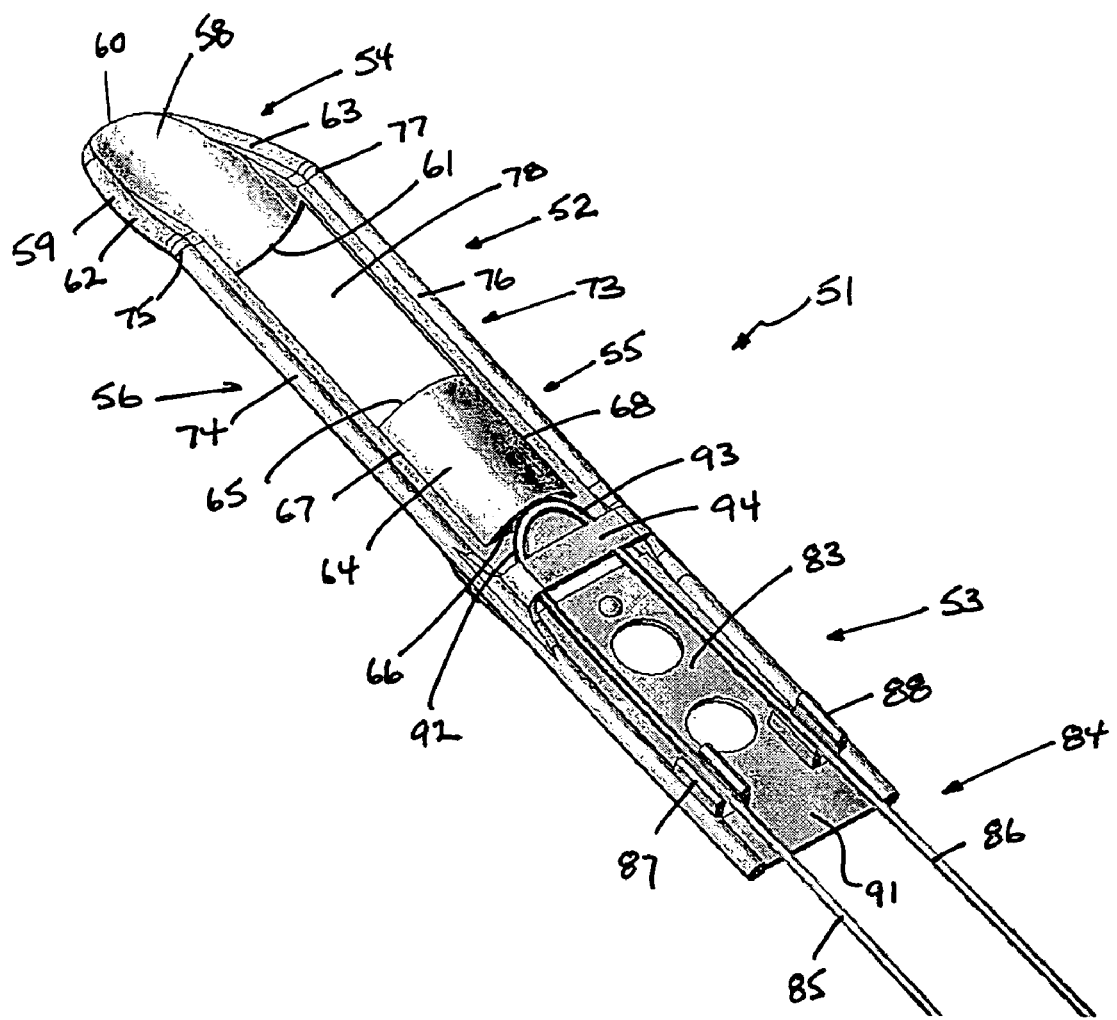
FIG. 9 is a perspective view of another embodiment of a fishing rod holder according to the present invention having a rod support section and a second section including modified means for attachment to the ground, dock, pier, seat etc
Figure 10:
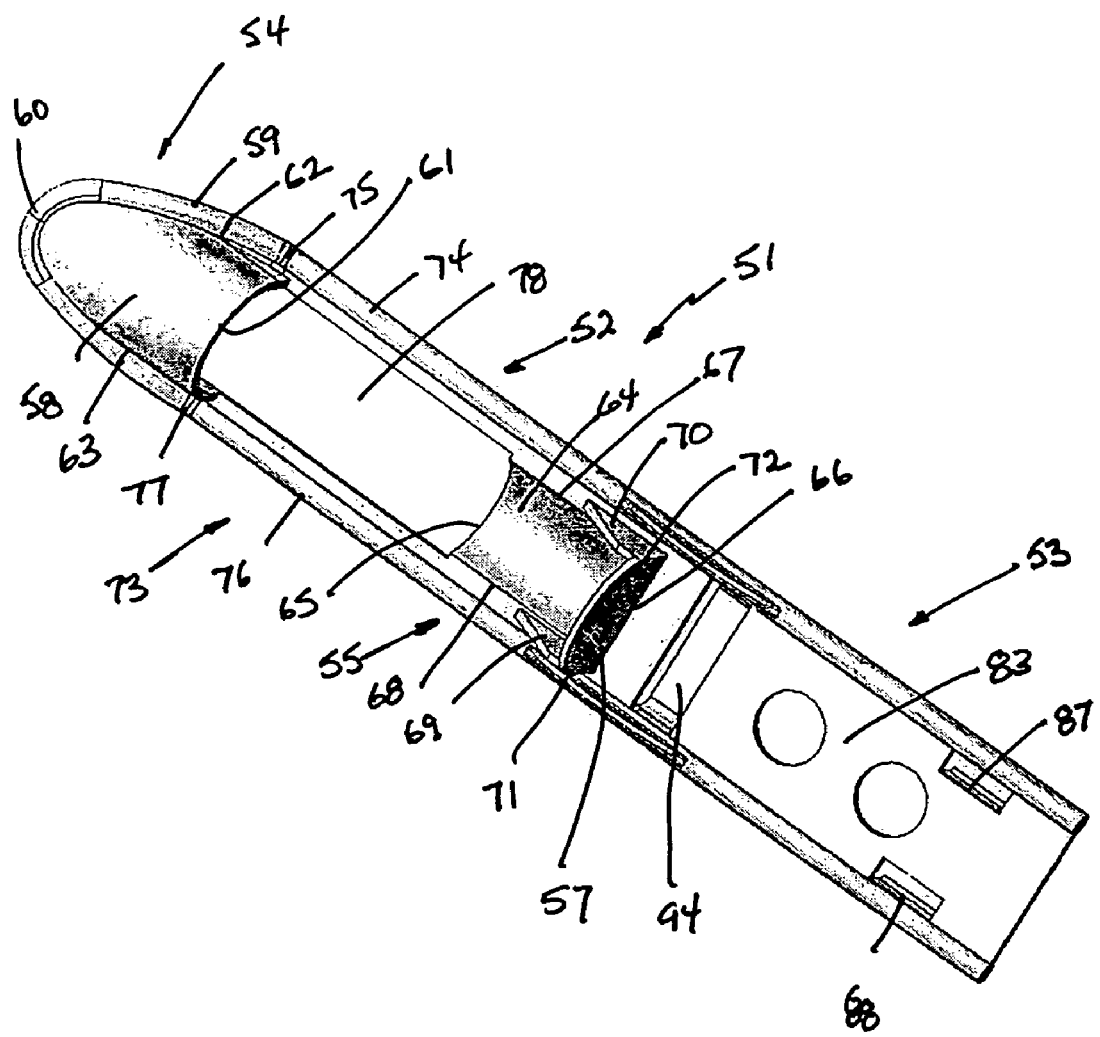
FIG. 10 is a top view of the fishing rod holder of FIG. 9 not including the modified means for attachment to the ground, dock, pier, seat etc.

Referring to FIGS. 9 and 10, another embodiment of a fishing rod holder according to the present invention is generally indicated at 51. The fishing rod holder 51 comprises a rod support section 52 and a second section 53 including means for attachment to the ground, dock, pier, seat etc.

The rod support section 52 is similar to the embodiment shown in FIGS. 1-8. It has a first support portion 54, a second support portion 55, means 56 to connect said first and second support portions 54,55 and a base portion 57. In the embodiment shown, the first support section 54 has a concave curved base plate 58 to support the bottom surface of an upper section of the fishing rod handle (not shown) and a lateral extending peripheral flange 59. The concave curved base plate 58 has a first end 60, second end 61 and opposing sides 62,63. The lateral extending peripheral flange 59 extends along the opposing sides 62,63, inclines downwardly and is tapered from the second end 61 to the first end 60 of concave curved base plate 58.

The second support portion 55 has a convex curved top plate 64 to support the top surface of a lower section of the fishing rod handle (not shown). The convex curved top plate 64 has a first end 65, second end 66 and opposing sides 67,68. Base portion 57 depends from the second end 66 of the convex curved top plate 64. The end of the fishing rod handle rests up against base portion 57 to position the handle within the rod support section. In the embodiment shown, base portion 57 has a pair of upstanding sidewalls 69,70 extending from the sides 71, 72 of base portion 57 along the opposing sides 67, 68 of the curved top plate 64 to keep the fishing rod handle from moving from side to side.

In the embodiment shown, the means 56 to connect said first and second support portions 54,55 comprise a pair of parallel connectors 73. One of said connectors 74 extends from one end 75 of the lateral extending peripheral flange 59 of the first support section 54 and along one side 67 of the convex curved top plate 64 of the second support portion 55. The other of said connectors 76 extends from another end 77 of the lateral extending peripheral flange 59 of the first support section 54 and along one side 68 of the convex curved top plate 64 of the second support portion 55. The connectors 74, 76, the second end 61 of the concave curved base plate 58 of the first support section 54 and the first end 65 of the convex top plate 64 of the second support section 55 define an opening 78.

The second section 53 of rod holder 51 is has a generally flat rectangular base 83 and means 84 for attachment to the ground, dock, pier, seat etc. In the embodiment illustrated, the fishing rod holder 51 is intended to be attached to the ground such as a bank or beach. The means 84 for attachment to the ground comprises a pair of rods 85, 86 inserted into bracket snaps 87,88 formed on the bottom surface 91 of base 83. The top 92,93 of rods 85, 86 fit under brace 94 which extends across and above the bottom surface 91 of base 83. The top 92,93 of rods 85, 86 abut against the end 66 of the convex top plate 64 of the second support section 55 for support. Rods 85,86 can be formed from a single piece of material and bent in a U-shape as shown.

Having illustrated and described a preferred embodiment of the invention and certain possible modifications thereto, it should be apparent to those of ordinary skill in the art that the invention permits of further modification in arrangement and detail. All such modifications are covered by the scope of the invention.

The Embodiments of the invention in which an exclusive property or privilege is claimed are defined as follows:

1. A fishing rod holder for attachment to the ground, dock, pier or seat of a boat, comprising:
   a rod support section having a first rod support portion, and a second rod support portion, the rod support section having an opening defined therein,
   the first rod support portion having a downwardly extending concave curved base plate for supporting a bottom surface of an upper section of a fishing rod handle, the first rod support portion having a flange extending downwardly angulary relative to the second rod support portion, the concave curved base plate having a straight closed longitudinal bottom, the concave curved base plate having a first end and a second end, the first and second ends being attached to the flange, the second end having opening defined therein, the bottom extending an entire length of the flange, the second rod support portion having a convex curved top plate for supporting a top surface or a lower section of the fishing rod handle, the concave curved base plate being longitudinally space apart from the convex curved top plate, the top plate having a straight longitudinal top, the bottom of the base plate being parallel to the top of the top plate, a base portion in operative engagement with a generally flat base for supporting an end surface of the fishing rod handle, the base portion extending downwardly and outwardly relative to the flat base so that the fishing rod handle is permitted to extend through the opening and be captured between the concave curved base plate and the convex curved top plate as the end surface rests upon the base portion, and means for connecting the first and second rod support portions comprising a pair of parallel connectors extending from the concave curved base plate the convex curved top plate.

2. The fishing rod holder according to claim 1 wherein the first support section has a laterally extending peripheral flange.

3. The fishing rod holder according to claim 2 wherein the peripheral flange extends around the concave curved base plate.

4. The fishing rod holder according to claim 3 wherein the base portion extends perpendicularly relative to a longitudinal direction of the fishing rod holder.

5. The fishing rod holder according to claim 4 wherein the base portion has a pair of upstanding side walls extending from each side of the base portion.

6. The fishing rod holder according to claim 5 wherein the parallel connectors extend along sides of the convex curved top plate.

7. The fishing rod holder according to claim 6 wherein the generally flat base has a pair of elongate slots.

8. The fishing rod holder according to claim 7 wherein the fishing rod holder has a pair of rods inserted into the elongate slots.

9. The fishing rod holder according to claim 8 wherein the rod support section and a second section are formed as one piece.

10. The fishing rod holder according to claim 9 wherein the fishing rod holder is made of molded plastic.

11. The fishing rod holder according to claim 1 wherein the fishing rod holder has a pair of rods inserted into bracket snaps attached to the fishing rod holder.

* * * * *